United States Patent
Takechi et al.

(10) Patent No.: US 11,543,817 B2
(45) Date of Patent: Jan. 3, 2023

(54) AUTONOMOUS DRIVING ASSISTANCE SYSTEM, VEHICLE CONNECTION SERVER, CONTROL SERVER, AUTONOMOUS DRIVING ASSISTANCE METHOD, AND SERVER CONTROL METHOD

(71) Applicant: PANASONIC INTELLECTUAL PROPERTY MANAGEMENT CO., LTD., Osaka (JP)

(72) Inventors: Hideaki Takechi, Osaka (JP); Yasushi Kojima, Osaka (JP); Shotaro Takano, Hyogo (JP); Shigeki Matsunaga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 282 days.

(21) Appl. No.: 16/916,746

(22) Filed: Jun. 30, 2020

(65) Prior Publication Data

US 2020/0326701 A1 Oct. 15, 2020

Related U.S. Application Data

(63) Continuation of application No. PCT/JP2019/008505, filed on Mar. 5, 2019.

(30) Foreign Application Priority Data

Mar. 15, 2018 (JP) .............................. JP2018-048392

(51) Int. Cl.
H04W 4/00 (2018.01)
G05D 1/00 (2006.01)
(Continued)

(52) U.S. Cl.
CPC .......... *G05D 1/0022* (2013.01); *H04W 4/029* (2018.02); *H04W 4/44* (2018.02);
(Continued)

(58) Field of Classification Search
CPC ..... H04W 36/30; H04W 36/18; H04W 24/00; H04W 48/16; H04W 36/14; H04W 4/029;
(Continued)

(56) References Cited

U.S. PATENT DOCUMENTS

2004/0157620 A1* 8/2004 Nyu ........................ H04W 8/10
455/403
2006/0200540 A1* 9/2006 Morishima ........... H04W 36/22
709/225
(Continued)

FOREIGN PATENT DOCUMENTS

CN 104780198 7/2015
JP 2001-147868 5/2001
(Continued)

OTHER PUBLICATIONS

International Search Report (ISR) from International Searching Authority (Japan Patent Office) in International Pat. Appl. No. PCT/JP2019/008505, dated May 7, 2019.
(Continued)

*Primary Examiner* — Phuongchau Ba Nguyen
(74) *Attorney, Agent, or Firm* — Greenblum & Bernstein, P.L.C.

(57) ABSTRACT

An autonomous driving assistance system is a system for assisting driving of vehicles, and includes a service server that provides services relating to the vehicles to operation terminals, a vehicle connection server connected to the vehicles via wireless communication routes, and a plurality of control servers each communicating with the vehicles by handover and respectively controlling travel of the vehicles
(Continued)

in different areas. When calling a vehicle parked in a predetermined area in accordance with the service provided by the service server, a control server that is associated with the predetermined area among the control servers causes the vehicle connection server connected to the vehicle to notify the vehicle of an end point, the end point being information indicating the location of the control server as a connection destination.

4 Claims, 8 Drawing Sheets

(51) Int. Cl.
*H04W 4/44* (2018.01)
*H04W 4/029* (2018.01)
*H04W 4/80* (2018.01)
*H04W 36/30* (2009.01)

(52) U.S. Cl.
CPC ............ *H04W 4/80* (2018.02); *H04W 36/30* (2013.01); *G05D 2201/0213* (2013.01)

(58) Field of Classification Search
CPC ......... H04W 4/44; H04W 4/80; H04W 12/06; H04W 4/021; H04W 4/024; H04W 4/33; G05D 1/0022; G05D 2201/0213; G08G 1/00; G08G 1/09; G08G 1/13; G08G 1/14
See application file for complete search history.

(56) References Cited

U.S. PATENT DOCUMENTS

| | | | | |
|---|---|---|---|---|
| 2007/0211664 | A1* | 9/2007 | Oyama | H04W 36/10 455/436 |
| 2008/0192701 | A1* | 8/2008 | Jeong | H04W 36/02 370/331 |
| 2011/0182250 | A1* | 7/2011 | Shin | H04W 4/029 370/329 |
| 2012/0157102 | A1* | 6/2012 | Yang | H04W 36/0016 455/436 |
| 2012/0195295 | A1* | 8/2012 | Elmaleh | H04W 4/023 370/338 |
| 2015/0195364 | A1 | 7/2015 | Petersen et al. | |
| 2015/0244672 | A1* | 8/2015 | Singhal | H04L 67/289 709/219 |
| 2018/0206166 | A1* | 7/2018 | Ganesan | H04W 36/18 |
| 2019/0297484 | A1* | 9/2019 | Dames | H04W 4/90 |

FOREIGN PATENT DOCUMENTS

| | | |
|---|---|---|
| JP | 2002-221433 | 8/2002 |
| JP | 2002-334388 | 11/2002 |
| JP | 2003-234758 | 8/2003 |
| JP | 2009-253828 | 10/2009 |
| JP | 2010-282446 | 12/2010 |
| JP | 2014-203173 | 10/2014 |
| JP | 2016-130897 | 7/2016 |
| JP | 2017-138924 | 8/2017 |
| JP | 2017-147626 | 8/2017 |

OTHER PUBLICATIONS

"Accomplishment Report on Research and Development Necessary for Demonstration of Automated Valet Parking Lots and Achievement of Advanced Autonomous Driving System in 2016 Smart Mobility System Research, Development and Demonstration Project", Japan Automobile Research Institute (JARI) as a general incorporated foundation consigned by the Ministry of Economy, Trade and Industry of Japan, Mar. 2017, p. I-2 and I-3, and p. I-100 to I-104, together with an English language translation.

Office Action from China National Intellectual Property Administration (CNIPA) in Chinese Patent Application No. 201980006207.0, dated Nov. 11, 2021, together with an English language translation and English language Search Report.

* cited by examiner

AUTONOMOUS DRIVING ASSISTANCE SYSTEM, VEHICLE CONNECTION SERVER, CONTROL SERVER, AUTONOMOUS DRIVING ASSISTANCE METHOD, AND SERVER CONTROL METHOD

CROSS REFERENCE TO RELATED APPLICATION

This is a continuation application of PCT International Application No. PCT/JP2019/008505 filed on Mar. 5, 2019, designating the United States of America, which is based on and claims priority of Japanese Patent Application No. 2018-048392 filed on Mar. 15, 2018.

FIELD

The present disclosure relates to systems and servers for assisting the driving of vehicles.

BACKGROUND

Remote operation systems for remotely operating vehicles have conventionally been proposed (see Patent Literature 1). Techniques for controlling remote operations of vehicles in a two-level hierarchy of wide areas and local areas have also been proposed (see Non-Patent Literature 1).

CITATION LIST

Patent Literature

PTL 1: Japanese Unexamined Patent Application Publication No. 2017-138924

Non Patent Literature

NPL 1: "Accomplishment Report on Research and Development Necessary for Demonstration of Automated Valet Parking Lots and Achievement of Advanced Autonomous Driving System in 2016 Smart Mobility System Research, Development and Demonstration Project", by Japan Automobile Research Institute (JARI) as a general incorporated foundation consigned by the Ministry of Economy, Trade and Industry of Japan, March, 2017

SUMMARY

However, the system of Patent Literature 1 and the system of Non-Patent Literature 1 can be improved upon.

In view of this, the present disclosure provides an autonomous driving assistance system, and so on, capable of improving on the related art.

An autonomous driving assistance system according to one aspect of the present disclosure is an autonomous driving assistance system for assisting driving of a vehicle, and includes a service server that provides a service relating to the vehicle to an operation terminal, a vehicle connection server connected to the vehicle via a wireless communication route, a plurality of control servers each communicating with the vehicle by handover and respectively controlling travel of the vehicle in different areas. When calling the vehicle parked in a predetermined area in accordance with the service provided by the service server, a control server that is associated with the predetermined area among the plurality of control servers causes the vehicle connection server connected to the vehicle to notify the vehicle of an end point, the end point being information indicating a location of the control server as a connection destination.

It is to be noted that such a generic or specific embodiment of the present disclosure may be embodied as a system, a method, an integrated circuit, a computer program, or a computer-readable recording medium such as a CD-ROM, or may be embodied as any combination of a system, a method, an integrated circuit, a computer program, and a recording medium.

The autonomous driving assistance system according to one aspect of the present disclosure is capable of improving upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Findings Forming Basis of Present Disclosure

Figure 1:
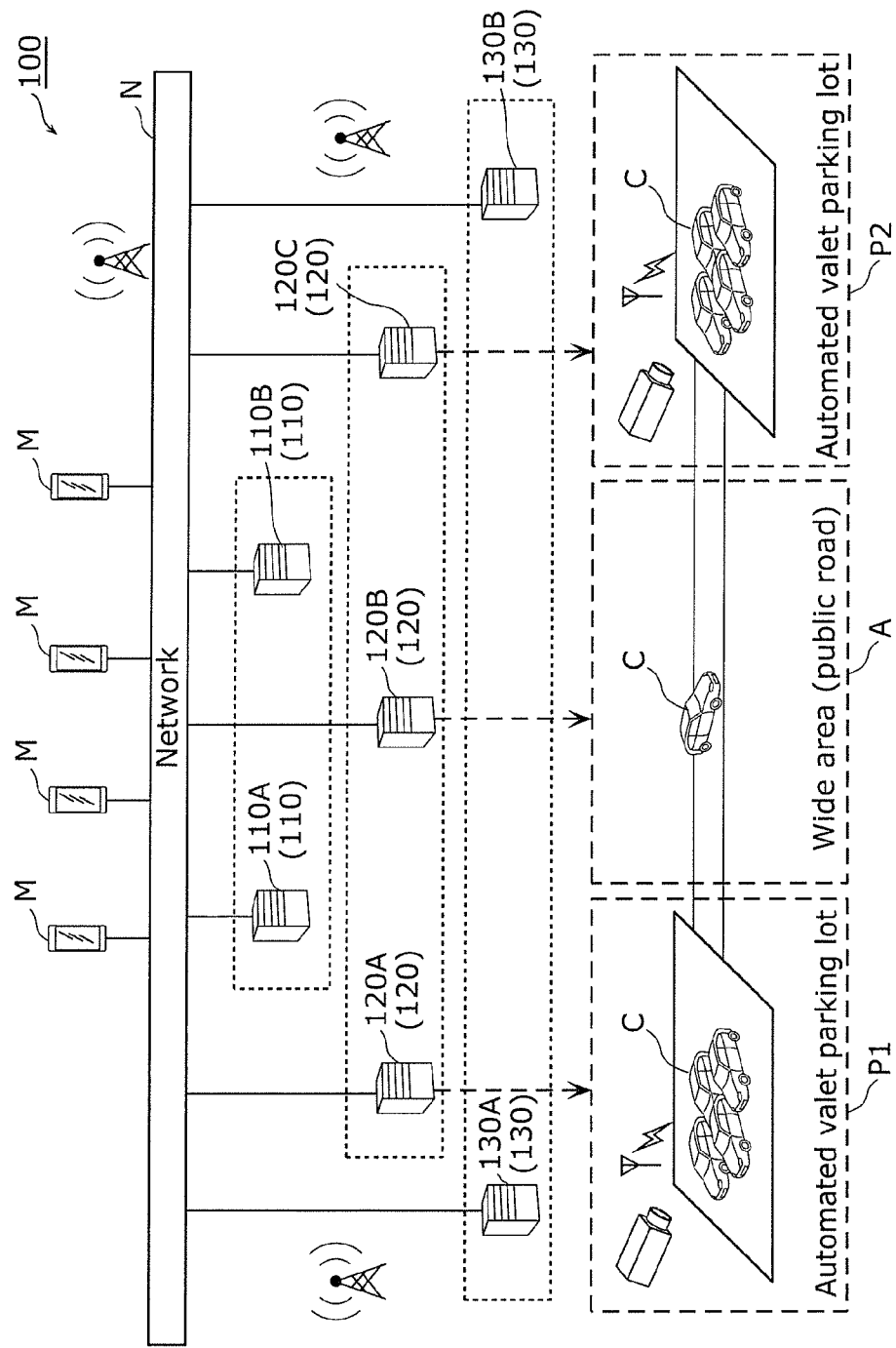
FIG. 1 illustrates an example of a configuration of an autonomous driving assistance system according to an embodiment.

The inventors of the present disclosure have found the following problems with Patent Literature 1 and Non-Patent Literature 1 described in the "Background Art".

For example, the system of Non-Patent Literature 1 includes local control servers that control vehicles located in parking lots corresponding to local areas, and integrated control servers that control vehicles located in wide areas. For example, the integrated control servers guide a vehicle from one parking lot to another parking lot. It can be said that such integrated control servers are at a higher level than the local control servers. That is, in the system of Non-Patent Literature 1, a plurality of servers arranged in a two-level hierarchy operate vehicles remotely. The system of Patent Literature 1 also includes a plurality of servers that remotely operate vehicles located in parking lots and cause the vehicles to autonomously drive to vacant spaces.

However, even if the plurality of servers in the system of Patent Literature 1 are configured in a two-level hierarchy as in the system of Non-Patent Literature 1, load will concentrate on any server. For example, it is necessary for a vehicle to speedily find and identify a server to which the vehicle is to be connected, from among the plurality of servers. Also, the target to be remotely operated is not limited to one vehicle, and many vehicles can be targeted for remote operation. Thus, in order to allow each vehicle to readily find a connection destination, load will concentrate on any server. That is, the server scale becomes a problem. It is also difficult to achieve both continuous vehicle calling and low latency. Continuous vehicle calling refers to maintaining servers in a condition capable of calling vehicles all the time. Low latency refers to shortening delay times in communication and processing between servers and vehicles. In order to shorten the delay times, in general it is effective to, for example, not select a redundant communication route, or limit load concentration. Moreover, it is also difficult to connect a plurality of servers of different qualities to already released vehicles with high maintainability. For example, there is the problem that considerable cost is necessary to combine a plurality of types of already released vehicles with a plurality of types of newly installed control servers and verify operations of the combinations.

An autonomous driving assistance system according to one aspect of the present disclosure is an autonomous driving assistance system for assisting driving of a vehicle, and includes a service server that provides a service relating to the vehicle to an operation terminal, a vehicle connection server connected to the vehicle via a wireless communication route, a plurality of control servers each communicating with the vehicle by handover and respectively controlling travel of the vehicle in different areas. When calling the vehicle parked in a predetermined area in accordance with the service provided by the service server, a control server that is associated with the predetermined area among the plurality of control servers causes the vehicle connection server connected to the vehicle to notify the vehicle of an end point, the end point being information indicating a location of the control server as a connection destination.

Accordingly, as a result of, for example, the vehicle connection server staying connected all the time to a vehicle, the autonomous driving assistance system allows a control server associated with the area in which the vehicle is parked to readily call the vehicle at any time via the vehicle connection server. In other words, load concentration on the control server can be relieved by causing the vehicle connection server, instead of the control server, to stay connected all the time to the vehicle. In the case where the service server provides services to many vehicles, it is necessary for the vehicle connection server to stay connected all the time to, for example, many vehicles, instead of only one vehicle. If the control servers stay connected all the time to vehicles, high load will be imposed on the control servers, and each control server cannot appropriately control the travel of a vehicle parked in the area associated with the control server. However, the autonomous driving assistance system according to one aspect of the present disclosure can reduce such load on the control servers, thereby allowing the control servers to appropriately control the travel of vehicles. In this way, since in the autonomous driving assistance system according to one aspect of the present disclosure, the plurality of servers are arranged in a three-level hierarchy of the service server, the control servers, and the vehicle connection server, it is possible to relieve load concentration and to appropriately assist the autonomous driving of vehicles.

When calling a vehicle, each control server causes the vehicle connection server to notify the vehicle of an end point. Thus, the called vehicle turns on, for example, the ignition and can appropriately establish a connection to the control server having called the vehicle and authenticate the control server with use of the end point. As a result, the vehicle can immediately establish a connection to the appropriate control server among the plurality of control servers and can securely communicate with the control server. At this time, the vehicle authenticates the vehicle connection server by appropriate means so as to establish a secure connection. Since the vehicle is not directly connected to the control servers, there is the advantage of, for example, eliminating the need to verify the security of every combination of vehicles and a plurality of types of control servers.

Each of the plurality of control servers communicates with vehicles by handover. Therefore, each vehicle can establish a connection to an appropriate control server depending on the area in which the vehicle is driving or parked. That is, each vehicle can switch the control server to which the vehicle is to be connected, depending on the area in which the vehicle is located, such as a wide area or a local area including a parking lot.

For example, when connected to the vehicle on the basis of the end point, the control server may conduct a negotiation for quality of service (QoS) with the vehicle.

By so doing, the control servers can ensure QoS necessary to control the travel of vehicles. That is, excess load concentration on any server can be avoided by allowing a vehicle to establish a connection to an appropriate control server allocated to each area, and delay times in communication between the control servers and vehicles can be shortened by eliminating the need to exchange the contents of communication via transfer of communication or a data storage that involves delays. As a result, the control servers can remotely operate vehicles unattended by drivers appropriately in parking lots. Accordingly, it is possible to achieve both continuous vehicle calling and low latency. Moreover, with the scheme according to one aspect of the present disclosure, even if each control server requires different QoS depending on, for example, the area such as a parking lot or a public road, vehicle's autonomous driving capability, or sensor performance, it is possible to match features, such as allowable communication latency, heart-beat intervals, behaviors in cases such as where latency exceeds an allowable level or where communication is interrupted, and the content of control regulation, in advance between the control server and the vehicle by conducting negotiations at the time of connection.

Also, when providing the service to the operation terminal, the service server may transmit an end point of each of the plurality of control servers to the operation terminal, and a control server that is associated with an end point selected by the operation terminal among the plurality of control servers may control travel of the vehicle in an area associated with the control server in accordance with the service.

This makes it possible to, for example, display a plurality of end points on the operation terminal as a list of areas where the service is available and thereby enable the user to select one of the areas. Accordingly, for example, the user is able to, by selecting a desired parking lot from the list, use a car-sharing service using vehicles in the parking lot and cause the vehicle to autonomously drive off the parking lot.

A vehicle connection server according to one aspect of the present disclosure is a vehicle connection server connected to a vehicle via a wireless communication route in order to assist the driving of the vehicle, and includes a processor and a memory. The memory stores connection address information about a wireless communication route to each of a plurality of vehicles, and a vehicle calling application programming interface (API) that has a function of receiving a calling request to call a vehicle, the calling request being accompanied with an end point, the end point being information indicating a location of a control server as a connection destination, and when receiving a calling request to call a target vehicle among the plurality of vehicles via the vehicle calling API, the processor calls, in response to the calling request, the target vehicle via the wireless communication route with use of the connection address information associated with the target vehicle, and notifies the target vehicle of the end point.

Accordingly, as a result of, for example, the vehicle connection server staying connected all the time to a vehicle, a control server associated with the area in which the vehicle is parked can readily call the vehicle at any time via the vehicle connection server. In other words, load concentration on the control server can be relieved by causing the vehicle connection server, instead of the control server, to stay connected all the time to the vehicle. For example, when a request to call a vehicle is issued from a control server, the vehicle is called and notified of an end point. Thus, the called vehicle turns on, for example, the ignition and can appropriately establish a connection to the control server having called the vehicle and authenticate the control server with use of the end point. As a result, the vehicle can securely communicate with the control server.

The processor may further perform filtering of the end point that accompanies the calling request having been received, to prevent the target vehicle from being notified of an invalid end point eliminated by the filtering and to notify the target vehicle of a valid end point.

This prevents the vehicle from being notified of the invalid end point and accordingly reduces the possibility that the vehicle is connected to an invalid control server.

The processor may further, when a first application programming interface (API) used by the control server does not correspond to a second API used by the target vehicle, convert a control command available with the first API and transmitted from the control server to the target vehicle into a command available with the second API to accommodate a difference between the first API and the second API, and convert a notification command available with the second API and transmitted from the target vehicle to the control server into a command available with the first API.

This accommodates a difference in API between the control server and the vehicle, thus making it possible to connect the plurality of control servers of different qualities and already released vehicles with high maintainability.

A control server according to one aspect of the present disclosure is a control server that controls the travel of a vehicle in a predetermined area, and includes a processor and a memory. The memory stores an end point, the end point being information indicating a location of the control server as a connection destination, and using the memory, the processor identifies the vehicle in response to a request received from a service server that provides a service relating to the vehicle to an operation terminal, and causes a vehicle connection server connected to the vehicle via a wireless communication route to notify the vehicle of the end point.

Accordingly, as a result of, for example, the vehicle connection server staying connected all the time to a vehicle, a control server associated with the area in which the vehicle is parked can readily call the vehicle at any time via the vehicle connection server. In other words, load concentration on the control server can be relieved by causing the vehicle connection server, instead of the control server, to stay connected all the time to the vehicle. For example when calling a vehicle, the control server causes the vehicle connection server to notify the vehicle of an end point. Thus, the called vehicle turns on, for example, the ignition and can appropriately establish a connection to the control server having called the vehicle and authenticate the control server with use of the end point. As a result, the vehicle can securely communicate with the control server.

The processor may further detect approach of the vehicle to an approach target area different from the predetermined area through near-field wireless communication performed between the vehicle and communication equipment located around the approach target area, identify an end point of a control server that controls travel of the vehicle in the approach target area, and notify the vehicle of the end point identified, through the near-field wireless communication or via the vehicle connection server connected to the vehicle via the wireless communication route.

For example, the communication equipment acquires a vehicle ID that is identification information for identifying a vehicle, from the vehicle through near-field wireless communication and transmits the vehicle ID to a control server. The vehicle ID is specifically a vehicle number inscribed on a license plate, a wireless call number (WCN) of an electronic toll collection system (ETC)-equipped vehicle, or a vehicle identification number (VIN). Upon receiving the vehicle ID from the communication equipment, the control server detects that the vehicle with this vehicle ID is approaching the approach target area associated with the communication equipment. The control server then transmits the end point of a control server that is associated with the approach target area to the communication equipment, and this end point is further given as a notification to the vehicle through near-field wireless communication. Accordingly, the control server can call the vehicle parked in the approach target area without disclosing the vehicle ID of the vehicle to any higher-level server such as the service server. Then, the control server can connect the called vehicle to the control server associated with the approach target area and cause the control server associated with the approach target area to control the travel of the called vehicle.

It is to be noted that such a generic or specific embodiment of the present disclosure may be embodied as a system, a method, an integrated circuit, a computer program, or a computer-readable recording medium such as a CD-ROM, or may be embodied as any combination of a system, a method, an integrated circuit, a computer program, and a recording medium.

Hereinafter, embodiments will be described in detail with reference to the drawings.

Each embodiment described below illustrates one generic or specific example of the present disclosure. Numerical values, shapes, materials, constituent elements, positions in the arrangement of the constituent elements and forms of connection of the constituent elements, steps, sequence of steps, and so on in the following embodiments are mere examples and do not intend to limit the scope of the present disclosure. Among the constituent elements described in the following embodiments, those that are not recited in any independent claim, which represents the broadest concept, are described as optional constituent elements. Note that each drawing is a schematic diagram and does not necessarily provide precise depiction. Substantially the same structural elements are given the same reference signs throughout the drawings.

EMBODIMENTS

[System Configuration]

FIG. 1 illustrates an example of a configuration of an autonomous driving assistance system according to an embodiment.

Autonomous driving assistance system 100 according to the present embodiment is a system capable of relieving load concentration, and includes two service servers 110A and 110B, three control servers 120A, 120B, and 120C, and two vehicle connection servers 130A and 130B.

Two service servers 110A and 110B are hereinafter collectively referred to as service servers 110. Similarly, three control servers 120A, 120B, and 12C are hereinafter collectively referred to as control servers 120. Similarly, two vehicle connection servers 130A and 130B are hereinafter collectively referred to as vehicle connection servers 130. The number of service servers 110 in autonomous driving assistance system 100 according to the present embodiment is not limited to two, and may be one, or three or more. Similarly, the number of control servers 120 is not limited to three, and may be one, two, or four or more. Similarly, the number of vehicle connection servers 130 is not limited to two, and may be one, or three or more.

Two service servers 110A and 110B, three control servers 120A, 120B, and 120C, and two vehicle connection servers 130A and 130B are connected to one another via network N. Network N is connected to a plurality of operation terminals M, each operated by a user. Unless otherwise specified, a "connection" according to the present embodiment may be a wireless communication connection, a wired communication connection, or a communication connection using both wired communication and wireless communication.

Service servers 110 provide services relating to one or a plurality of vehicles C to operation terminals M. Specifically, service servers 110 communicate with operation terminals M via network N and provide services to operation terminals M. Examples of the services include making reservations for parking lots in order to park vehicles C, calling vehicles C parked in parking lots in order to retrieve vehicles C out of the parking lots, and allowing the shared use of vehicles C.

Control servers 120A, 120B, and 120C communicate with vehicles C by handover and control the travel of vehicles C in different areas. For example, control server 120A controls the travel of each vehicle C in automated valet parking lot P1. Control server 120B controls the travel of each vehicle C in wide area A such as a city or a town. Control server 120C controls the travel of each vehicle C in automated valet parking lot P2. Automated valet parking lots P1 and P2 are hereinafter collectively referred to as automated valet parking lots P. Controlling the travel of vehicles C in automated valet parking lots P and areas such as wide areas is hereinafter also referred to as "having jurisdiction". That is, control servers 120A, 120B, and 120C have jurisdiction over automated valet parking lot P1, wide area A, and automated valet parking lot P2, respectively. The details of automated valet parking lots P will be described later.

Control servers 120A, 120B, and 120C communicate with each vehicle C via a wireless communication base station located in wide area A or via communication equipment located in automated valet parking lots P.

Vehicle connection server 130A establishes connections to vehicles C via wireless communication routes. Specifically, vehicle connection server 130A, for example, stays connected all the time to each vehicle C manufactured by automobile manufacturer A. Similarly, vehicle connection server 130B, for example, stays connected all the time to each vehicle C manufactured by automobile manufacturer B. Such continuous connections are established via the wireless communication base station located in wide area A or via the communication equipment located in automated valet parking lots P.

In the present embodiment, for example, when calling vehicle C parked in automated valet parking lot P1 in accordance with the service provided by service server 110A, control server 120A associated with automated valet parking lot P1 causes vehicle connection server 130A connected to vehicle C to notify vehicle C of an end point, the end point being information indicating the location of control server 120A as a connection destination.

In autonomous driving assistance system 100 according to the present embodiment described above, as a result of, for example, vehicle connection server 130 staying connected all the time to vehicle C, control server 120 associated with the area in which vehicle C is parked can readily call vehicle C at any time via vehicle connection server 130. In other words, load concentration on control server 120 can be relieved by causing vehicle connection server 130, instead of control server 120, to stay connected all the time to vehicle C. In the case where service server 110 provides services to many vehicles C, it is necessary for vehicle connection server 130 to, for example, stay connected all the time to, for example, many vehicles, instead of only one vehicle. If the control servers stay connected all the time to vehicles C, high load will be imposed on the control servers, and each control server cannot appropriately control the travel of vehicles C parked in the area associated with the control server. However, autonomous driving assistance system 100 according to the present embodiment can reduce such load on control servers 120, thereby allowing control servers 120 to appropriately control the travel of vehicles C. In this way, since in autonomous driving assistance system 100 according to the present embodiment, the plurality of servers are arranged in a three-level hierarchy of service servers 110, control servers 120, and vehicle connection servers 130, it is possible to relieve load concentration and to appropriately assist the autonomous driving of vehicles C.

When calling vehicle C, each control server 120 causes vehicle connection server 130 to notify vehicle C of an end point. Thus, called vehicle C, for example, turns on the ignition and can appropriately establish a connection to control server 120 having called the vehicle and to authenticate control server 120 with use of the end point. As a result, vehicle C can securely communicate with control server 120.

Each of the plurality of control servers 120 communicates with vehicles by handover. Thus, vehicle C can establish a connection to appropriate control server 120 associated with the area in which the vehicle is driving or parked. That is, vehicle C can switch control server 120 to which the vehicle is to be connected, depending on the area in which vehicle C is located, such as a wide area or a parking lot.

Automated Valet Parking Lot

Automated valet parking lots P are parking lots in which a plurality of vehicles C can autonomously drive and be parked. Specifically, in automated valet parking lot P, control server 120 that has jurisdiction over automated valet parking lot P communicates with vehicle C unattended by a driver via network N and causes vehicle C to autonomously drive and be parked in a vacant space of the park. For example, upon receiving a request to retrieve a vehicle out of a parking lot from operation terminal M via service server 110 and network N, control server 120 calls vehicle C parked in automated valet parking lot P via vehicle connection server 130. Control server 120 then causes vehicle C to autonomously drive and stop at, for example, the exist of the parking lot.

Figure 2:
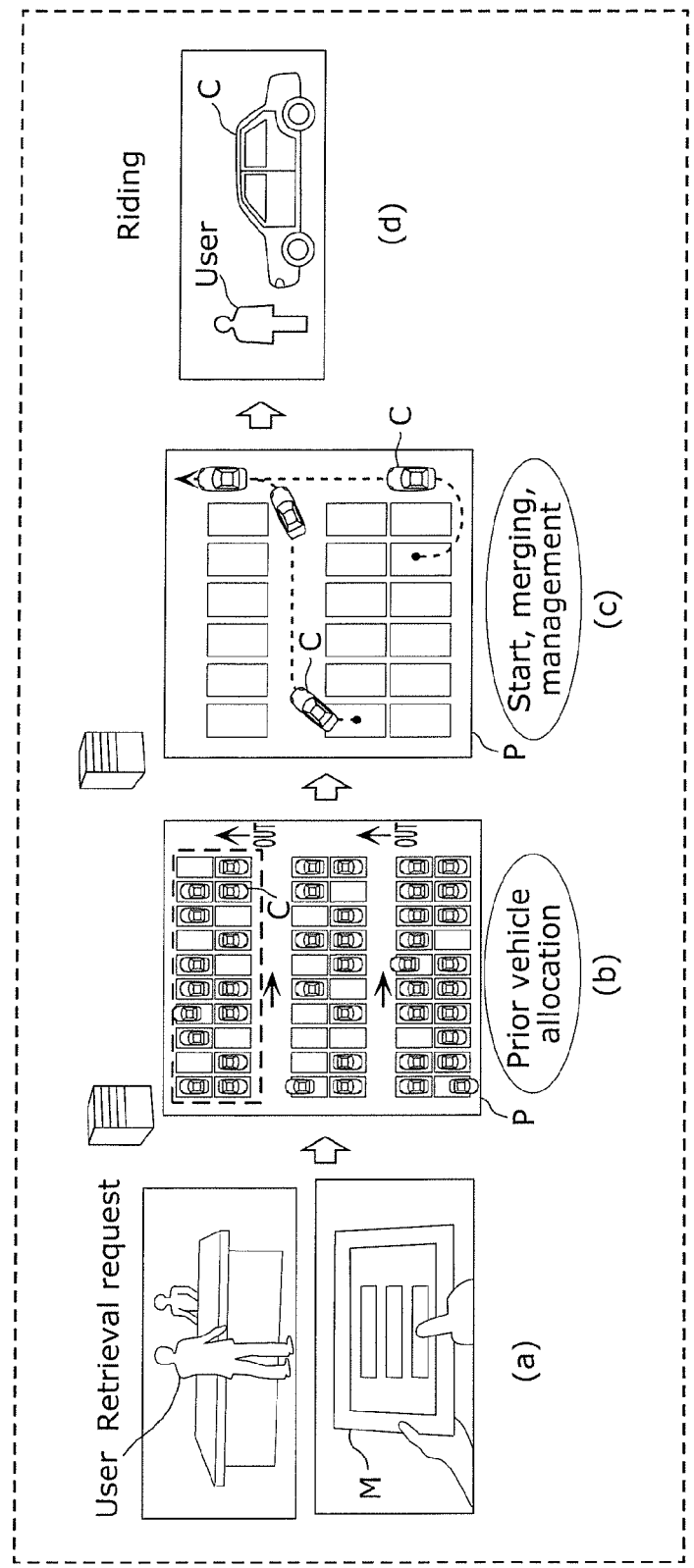
FIG. 2 illustrates an example of use of automated valet parking lots according to the embodiment.

FIG. 2 illustrates an example of use of automated valet parking lot P.

For example, as illustrated in (a) of FIG. 2, a user calls vehicle C parked in automated valet parking lot P by operating operation terminal M within a facility related to automated valet parking lot P. For example, the user sets the time of arrival of vehicle C at the exit of automated valet parking lot P to five minutes after the current time by operating operation terminal M.

Control server 120 that has jurisdiction over automated valet parking lot P accepts the request to call vehicle C from operation terminal M via service server 110. Then, as illustrated in (b) and (c) of FIG. 2, control server 120 calls vehicle C requested by operation terminal M and dispatches vehicle C to the exit of automated valet parking lot P by causing vehicle C to autonomously drive. At this time, in the case of wide automated valet parking lot P as illustrated in (b) of FIG. 2, control server 120 may predict retrieval of vehicle C and dispatch vehicle C in advance to the vicinity of the exit of automated valet parking lot P. As another alternative, control server 120 may control the travel of a plurality of vehicles C in automated valet parking lot P as illustrated in (c) of FIG. 2. In this case, even if automated valet parking lot P is crowded with many vehicles C, the control server can cause vehicles C to run without causing gridlock.

Then, the user rides into vehicle C dispatched to the exit of automated valet parking lot P as illustrated in (d) of FIG. 2.

Figure 3:
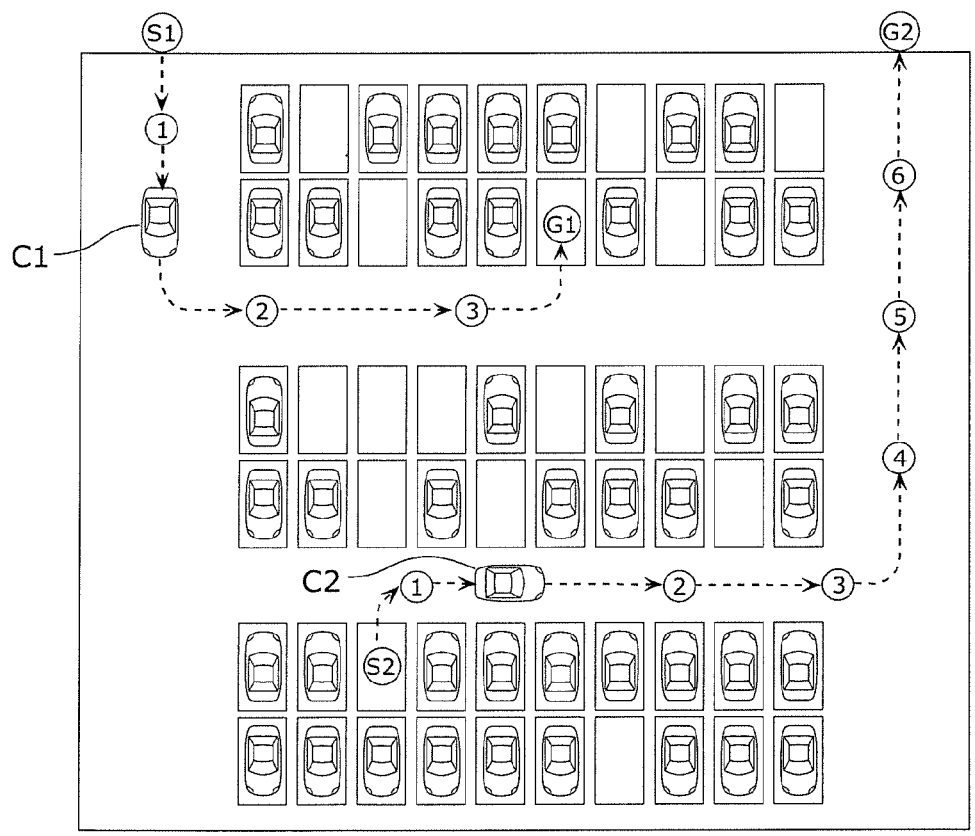
FIG. 3 illustrates an example in which a control server according to the embodiment controls the travel of vehicles in an automated valet parking lot.

FIG. 3 illustrates an example in which control server 120 controls the travel of vehicles C in automated valet parking lot P.

For example, control server 120 controls and causes vehicle C1, which is one example of vehicles C described above, to run from entrance S1 of automated valet parking lot P to vacant space G1. Specifically, control server 120 generates a plurality of nodes arranged in order in a travel route from entrance S1 to vacant space G1. These nodes each include a coordinate position of the node and a transit time of vehicle C1 at the node. For each node, control server 120 controls the travel of vehicle C1 so that vehicle C1 passes through the coordinate position of the node at the transit time of the node. Specifically, control server 120 controls the travel of vehicle C1 by transmitting a control command that indicates each node to vehicle C1.

Similarly, control server 120 controls and causes vehicle C2, which is one example of vehicles C described above, to run from parking space S2 in which the vehicle is parked to exit G2 of automated valet parking lot P. Specifically, control server 120 generates a plurality of nodes arranged in order in a travel route from parking space S2 to exit G2. These nodes each include a coordinate position of the node and a transit time of vehicle C2 at the node. For each node, control server 120 controls the travel of vehicle C2 so that vehicle C2 passes through the coordinate position of the node at the transit time of the node. Specifically, control server 120 controls the travel of vehicle C2 by transmitting a control command that indicates each node to vehicle C2.

Specific Example of System

Figure 4:
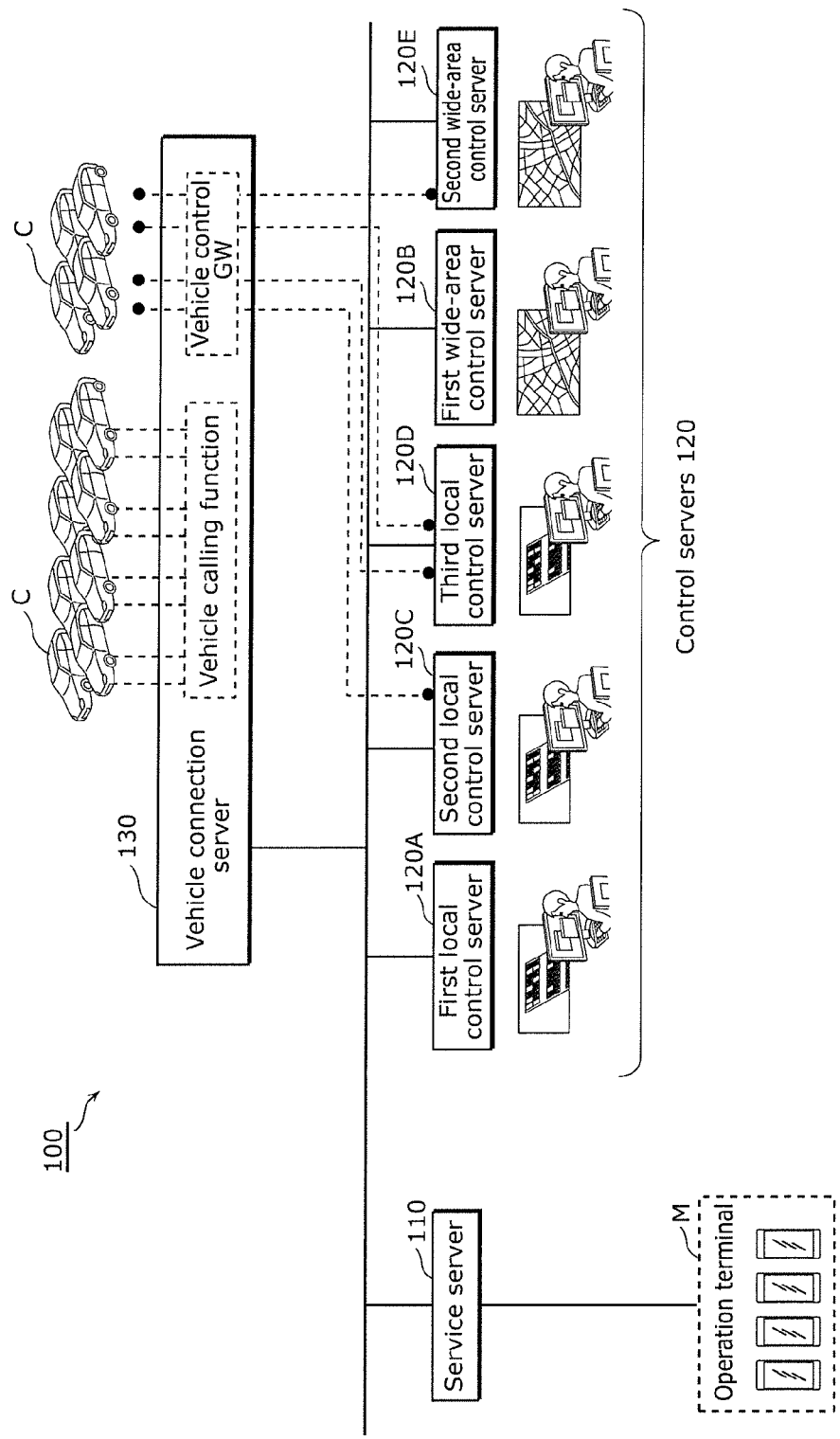
FIG. 4 illustrates a specific configuration example of the autonomous driving assistance system according to the embodiment.

FIG. 4 illustrates a specific configuration example of autonomous driving assistance system 100 according to the present embodiment.

For example, autonomous driving assistance system 100 may include other control servers 120, in addition to control servers 120A and 120B described above. In the example illustrated in FIG. 4, autonomous driving assistance system 100 includes first local control server 120A, second local control server 120C, third local control server 120D, first wide-area control server 120B, and second wide-area control server 120E as control servers 120 described above. Control server 120A illustrated in FIG. 1 corresponds to first local control server 120A illustrated in FIG. 4, control server 120C illustrated in FIG. 1 corresponds to second local control server 120C illustrated in FIG. 4, and control server 120B illustrated in FIG. 1 corresponds to first wide-area control server 1208 illustrated in FIG. 4.

Third local control server 120D has, for example, jurisdiction over automated valet parking lot P different from automated valet parking lots P1 and P2 that are respectively under the jurisdiction of first local control server 120A and second local control server 120C.

Second wide-area control server 120E has jurisdiction over a wide area, such as a city or a town, other than wide area A illustrated in FIG. 1.

Vehicle connection server 130 includes a vehicle calling function and a vehicle control gateway (GW).

The vehicle calling function is a function of calling vehicle C parked in automated valet parking lot P that is under the jurisdiction of control server 120 in response to a request from control server 120.

The vehicle control GW relays communication between control server 120 and vehicles C so as to enable control server 120 to control the travel of vehicles C.

Figure 5:
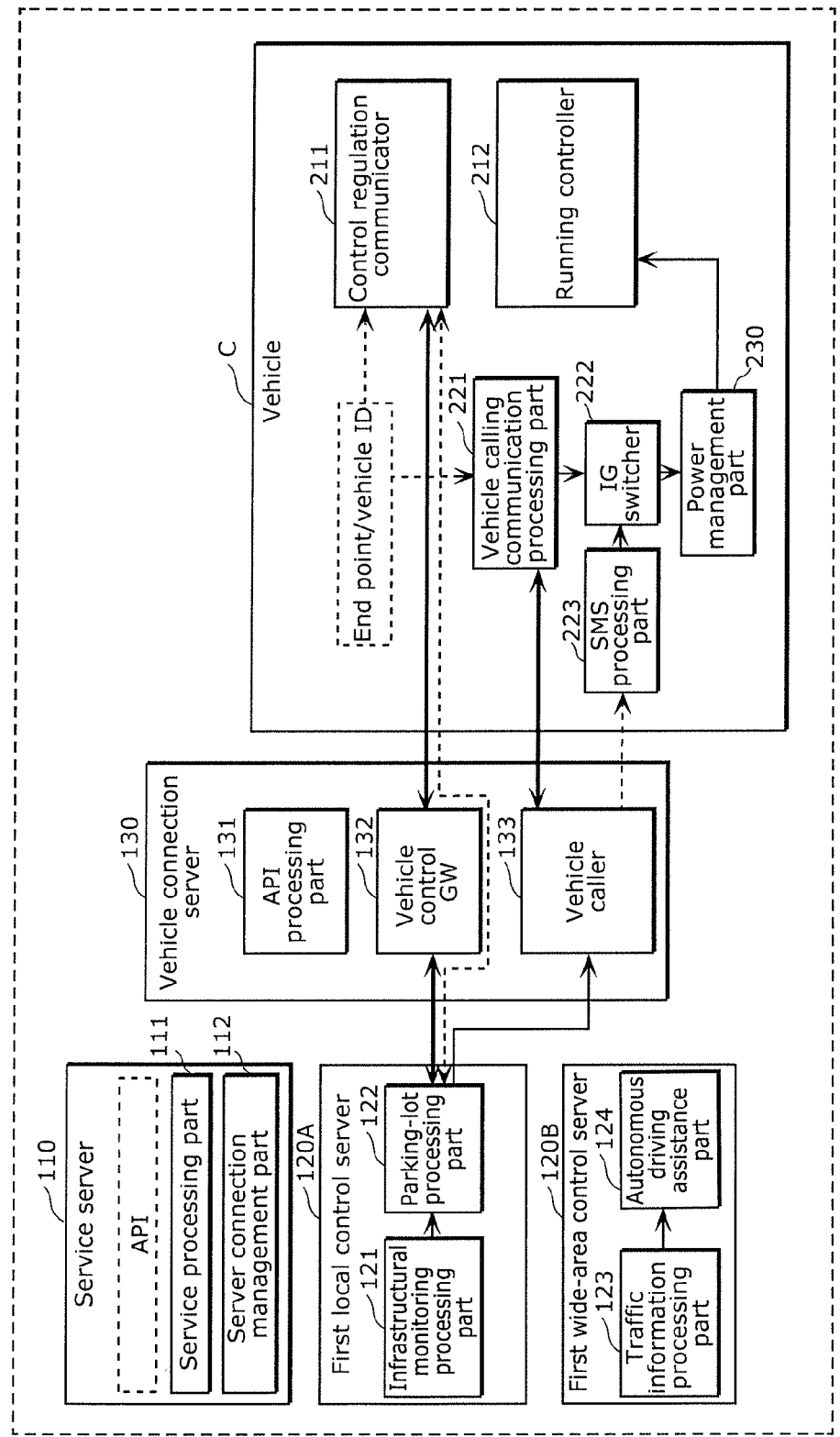
FIG. 5 illustrates an example of configurations of each server and a vehicle according to the embodiment.

FIG. 5 illustrates an example of configurations of each server and vehicle C according to the present embodiment. FIG. 5 illustrates only first local control server 120A and first wide-area control server 120B among the plurality of control servers 120 illustrated in FIG. 4, and does not illustrate the other control servers 120.

Service server 110 includes various application programming interfaces (APIs). Examples of these APIs include an API for enabling information processing between operation terminals M such as smartphones and service server 110, and an API for enabling information processing between user operations and service server 110.

Service server 110 further includes service processing part 111 and server connection management part 112.

Service processing part 111 provides at least one service among services such as making a reservation for a parking lot and calling vehicle C or navigating vehicle C in a public road or a private road in wide area A or other areas, and a car-sharing service using vehicle C. These services are provided to operation terminals M and used by users of operation terminals M.

Server connection management part 112 manages connections of control servers 120. That is, server connection management part 112 establishes connections to control servers 120 in response to, for example, requests from operation terminals M.

First local control server 120A includes, for example, infrastructural monitoring processing part 121 and parking-lot processing part 122. Infrastructural monitoring processing part 121 acquires, via communication equipment, detection signals transmitted from a plurality of infrastructural sensors located in automated valet parking lot P, which is under the jurisdiction of first local control server 120A, and outputs the detection signals to parking-lot processing part 122. Examples of the plurality of infrastructural sensors include cameras that capture images of sites in automated valet parking lot P, proximity sensors that detect the proximity of vehicles C, and sensors that acquire information from vehicles C. On the basis of the detection signals received from infrastructural monitoring processing part 121, parking-lot processing part 122 controls vehicles C that are travelling or parked in automated valet parking lot P that is under jurisdiction.

First wide-area control server 120B includes, for example, traffic information processing part 123 and autonomous driving assistance part 124. Traffic information processing part 123 acquires traffic information in wide area A that is under the jurisdiction of first wide-area control server 120B, and outputs the traffic information to autonomous driving assistance part 124. The traffic information includes the map of wide area A and information about a traffic jams, for example. On the basis of the traffic information received from traffic information processing part 123, autonomous driving assistance part 124 assists the autonomous driving of vehicle C in wide area A that is under the jurisdiction, by controlling vehicle C through communication.

In this way, control servers 120 such as first local control server 120A and first wide-area control server 120B according to the present embodiment are servers that control the travel of vehicles C in a predetermined area such as automated valet parking lot P or wide area A. Control servers 120 each include a processor and a memory as a specific hardware structure that implements infrastructural monitoring processing part 121 and parking-lot processing part 122 described above, or traffic information processing part 123 and autonomous driving assistance part 124 described above. The memory stores an end point, the end point being information indicating the location of corresponding control server 120 as a connection destination. The processor identifies vehicle C in response to a request from service server 110 that provides services relating to vehicle C to operation terminals M. The processor further causes vehicle connection server 130 connected to vehicle C via a wireless communication route to notify vehicle C of the end point stored in the memory. Note that the memory may store a program for causing the processor to operate as described above.

When connected to vehicle C on the basis of the end point, control server 120 may also conduct negotiations for quality of service (QoS) with vehicle C. This allows control server 120 to ensure QoS necessary to control the travel of vehicle C. That is, it is possible to shorten a delay time in communication between control server 120 and vehicle C. As a result, control server 120 can, for example, remotely operate vehicle C unattended by a driver appropriately in a parking lot. Accordingly, both continuous calling of vehicle C and low latency can be achieved in the present embodiment.

When providing a service to operation terminal M, service server 110 may transmit the endpoints of the plurality of control servers 120 to operation terminal M. In this case, control server 120 that is associated with an end point selected by operation terminal M among the plurality of control servers 120 controls the travel of vehicle C in the area associated with control server 120 in accordance with the aforementioned service. Accordingly, it is possible to, for example, display a plurality of end points on operation terminal M as a list of areas where the service is available and thereby enable the user of operation terminal M to select one of the areas. Accordingly, for example, the user is able to, by selecting a desired parking lot from the list, use a car-sharing service using vehicles C parked in that parking lot and cause vehicle C to autonomously drive off the parking lot.

Vehicle C includes control regulation communicator 211, travel controller 212, vehicle calling communication processing part 221, IG switcher 222, SMS processing part 223, and power management part 230. Some or all of these constituent elements of vehicle C may be implemented by a plurality of electronic control units (ECUs) and telematics control unit (TCU) that constitute a vehicle-installed network.

Control regulation communicator 211 directly or indirectly communicates with control servers 120. For example, control regulation communicator 211 communicates with parking-lot processing part 122 of first local control server 120A. At this time, information indicating the location of parking-lot processing part 122 as a connection destination is handled as an end point. For example, control regulation communicator 211 communicates with parking-lot processing part 122 with use of the end point and a vehicle ID. The vehicle ID is information for identifying vehicle C. Specifically, the vehicle ID is a vehicle number inscribed on a license plate of vehicle C, a wireless call number (WCN) of an electronic toll collection system (ETC)-equipped vehicle, or a vehicle identification number (VIN).

Direct communication between control regulation communicator 211 and parking-lot processing part 122 may use, for example, a WebSocket/JSON-RPC (JavaScript (registered trademark) Object Notation-Remote Procedure Call) protocol using Secure Sockets Layer (SSL) communication. This connection can implement secure and real-time control communication. Parking-lot processing part 122 of first local control server 120A transmits heart-beat signals through the direct communication and confirms that a connection to vehicle C can be established.

Alternatively, control regulation communicator 211 may perform indirect interactive control communication with parking-lot processing part 122 via vehicle control GW 132 of vehicle connection server 130. For example, a long term evolution (LTE) communication standard using Secure Sockets Layer (SSL) is applied to this communication. In this case, secure and real-time control communication can be implemented in a wide area. When communication with low latency is required, it is also possible to use, for example, data communication layers with high QoS in 5G network. Moreover, as a result of vehicle connection server 130 appropriately converting communication protocol specifications of control server 120 and vehicle C, it is possible to adopt an appropriate communication scheme for each vehicle type without depending on the communication protocol specifications of control server 120.

Running controller 212 acquires a control command, which is transmitted from control server 120 to control regulation communicator 211, from control regulation communicator 211 and controls vehicle C on the basis of the control command. That is, the motor, the ignition, and other parts of vehicle C are controlled.

Vehicle calling communication processing part 221 performs interactive control communication with vehicle caller 133 of vehicle connection server 130. This communication uses, for example, WebSocket on SSL. Vehicle calling communication processing part 221 accepts a call from vehicle caller 133. Specifically, vehicle calling communication processing part 221 receives an instruction to turn on the ignition of vehicle C and an end point. Vehicle calling communication processing part 221 notifies control regulation communicator 211 of the end point received from vehicle caller 133. This enables control regulation communicator 211 and first local control server 120A to communicate with each other. Moreover, upon receiving the instruction to turn on the ignition from vehicle caller 133, vehicle calling communication processing part 221 notifies IG switcher 222 of the instruction.

Like vehicle calling communication processing part 221, SMS processing part 223 receives a call from vehicle caller 133. For example, SMS processing part 223 receives the call via a short message service (SMS). Then, SMS processing part 223 notifies control regulation communicator 211 of the end point received from vehicle caller 133. This enables control regulation communicator 211 and first local control server 120A to communicate with each other. Upon receiving the instruction to turn on the ignition from vehicle caller 133, SMS processing part 223 further notifies IG switcher 222 of the instruction. In general, SMS communication may be via cues in carriers, which may result in unexpected latency. Even in this case, the communication via vehicle control GW 132 ensures communication with constant latency, and thereby allows first local control server 120A to perform control with appropriate QoS.

Upon receiving a notification from vehicle calling communication processing part 221 or SMS processing part 223, IG switcher 222 controls power management part 230 to turn on the ignition of vehicle C.

Power management part 230 instructs travel controller 212 to turn on the ignition under the control of IG switcher 222. As a result, travel controller 212 turns on the ignition of vehicle C.

Vehicle connection server 130 includes API processing part 131, vehicle control GW 132, and vehicle caller 133.

Vehicle control GW 132 is the vehicle control GW illustrated in FIG. 4, and is connected to control servers 120 such as first local control server 120A, and control regulation communicators 211 of vehicles C. That is, vehicle control GW 132 performs interactive control communication with parking-lot processing part 122 of first local control server 120A and performs interactive control communication with control regulation communicators 211 of vehicles C. For example, an LTE communication standard using SSL is used for this communication Note that vehicle control GW 132 establishes interactive RPC connections with low latency and high availability when establishing connections between parking-lot processing part 122 of first local control server 120A and vehicles C. Thus, parking-lot processing part 122 can communicate with vehicles C with a delay of, for example, several hundred milliseconds. Accordingly, when one vehicle C is traveling in automated valet parking lot P1 that is under the jurisdiction of first local control server 120A, parking-lot processing part 122 can transmit heart-beat signals at short intervals (e.g., one second), and can stop the travel of vehicle C if there is a problem with vehicle C.

Vehicle caller 133 accepts a request to call a vehicle from parking-lot processing part 122 of first local control server 120A. This request from parking-lot processing part 122 to vehicle caller 133 is made via a Web API, for example. This request is a request to call vehicle C and accompanied with the end point, which is information indicating the location of first local control server 120A as a connection destination. Upon receiving this request, vehicle caller 133 calls vehicle calling communication processing part 221 or SMS processing part 223 of vehicle C. That is, vehicle caller 133 transmits an instruction to turn on the ignition of vehicle C and the end point of parking-lot processing part 122 to vehicle calling communication processing part 221 or SMS processing part 223.

API processing part 131 converts APIs so as to, for example, match the API of control server 120 such as first local control server 120A to the API of vehicle C. That is, when a first API used by control server 120 does not correspond to a second API used by vehicle C, API processing part 131 converts a control command available with the first API and transmitted from control server 120 to vehicle C into a command available with the second API so as to accommodate a difference between the first API and the second API. Moreover, API processing part 131 converts a notification command available with the second API and transmitted from vehicle C to control server 120 into a command available with the first API.

Accordingly, even if vehicles C differ in the year of manufacture or vehicle type, i.e., each vehicle C uses a different API, control server 120 such as first local control server 120A can appropriately control vehicles C. In other words, it is possible to connect a plurality of control servers 120 of different qualities to already released vehicles C with high maintainability.

As described above, vehicle connection server 130 according to the present embodiment is a server that is connected to vehicle C via a wireless communication route in order to assist the driving of vehicle C. Vehicle connection server 130 includes the processor and the memory as a specific hardware configuration that implements API processing part 131, vehicle control GW 132, and vehicle caller 133 described above. The memory stores connection address information about a wireless communication route to each of a plurality of vehicles, and a vehicle calling application programming interface (API) that has a function of receiving a request to call a vehicle, accompanied with an end point, the end point being information indicating the location of control server 120 as a connection destination. When a request to call vehicle C among a plurality of vehicles has been received via the vehicle calling API, the processor calls vehicle C, in response to the request, via the wireless communication route with use of the connection address information associated with vehicle C and notifies vehicle C of the end point. For example, the processor acquires a request to call vehicle C and the end point, which is information indicating the location of control server 120 as a connection destination, from control server 120 that is associated with the area in which vehicle C is located and that controls the travel of vehicle C. The processor further calls vehicle C in response to the request and notifies vehicle C of the acquired end point. Note that the memory may store a program for causing the processor to operate as described above. The processor may further perform filtering of the end point in order to prevent vehicle C from being notified of an invalid end point eliminated by the filtering and to notify vehicle C of a valid end point. This prevents vehicle C from being notified of an invalid end point and accordingly reduces the possibility that vehicle C is connected to an invalid control server.

Processing Operations

Figure 6:
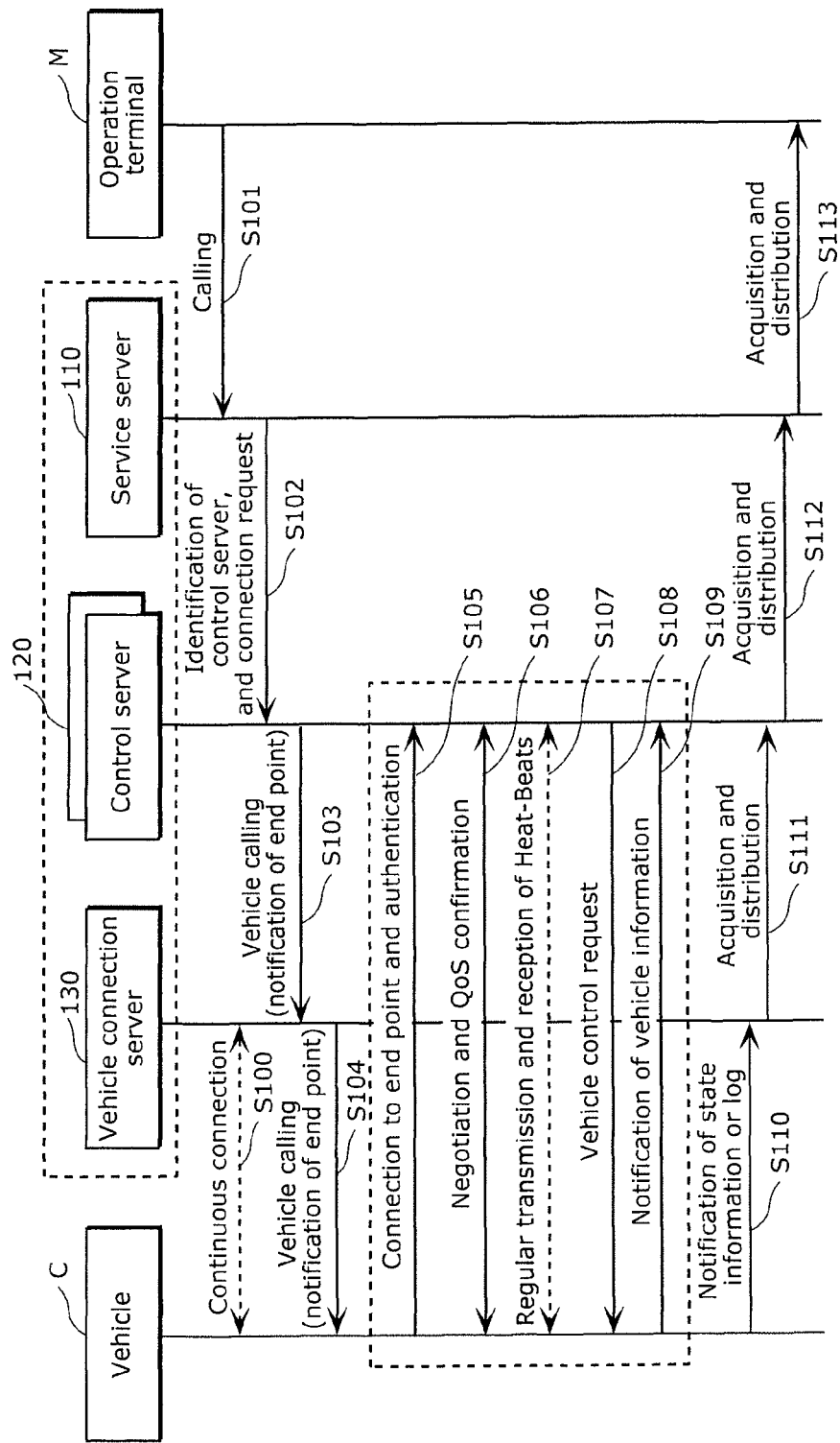
FIG. 6 is a sequence diagram illustrating an example of processing operations of the autonomous driving assistance system according to the embodiment.

FIG. 6 is a sequence diagram illustrating an example of processing operations of autonomous driving assistance system 100 according to the present embodiment. Specifically, FIG. 6 illustrates processing operations performed when calling vehicle C parked in automated valet parking lot P1.

First, a user instructs service server 110 to call vehicle C by operating operation terminal M (step S101). Service server 110 identifies control server 120 that has jurisdiction over automated valet parking lot P1 in which vehicle C is parked, from among a plurality of control servers 120. Then, service server 110 requests identified control server 120 to establish a connection to vehicle C (step S102).

Next, control server 120 that has received the request from service server 110 requests vehicle connection server 130 to call vehicle C and notifies vehicle connection server 130 of an end point (step S103). This end point is the end point of control server 120 that has received the request from service server 110.

In the present embodiment, vehicle connection server 130 stays connected all the time to each vehicle C (step S100). Thus, vehicle connection server 130 that has received the request from control server 120 can smoothly call vehicle C and transmit the end point to vehicle C (step S104).

Vehicle C that has been called from vehicle connection server 130 and received the end point establishes a connection to control server 120 associated with the end point and authenticates control server 120 (step S105). Then, control server 120 and vehicle C conduct negotiations for quality of service (QoS) with each other and confirm the QoS (step S106). That is, when connected to vehicle C on the basis of the end point, control server 120 conducts negotiations for QoS with vehicle C.

Moreover, control server 120 and vehicle C start transmitting and receiving heart-beat signals to and from each other at regular time intervals (step S107).

Then, control server 120 transmits, to vehicle C, a vehicle control request as a command for controlling the travel of vehicle C (step S108). Upon receiving the vehicle control request, vehicle C notifies control server 120 of vehicle information corresponding to the vehicle control request (step S109).

Then, vehicle C notifies vehicle connection server 130 of state information or a log that indicates the travel state of vehicle C, while travelling in accordance with the vehicle control request (step S110). Upon acquiring the aforementioned state information or log, vehicle connection server 130 distributes the state information or log to control server 120 (step S111). Control server 120 that has acquired the aforementioned state information or log distributes the state information or log to service server 110 (step S112). Moreover, service server 110 that has acquired the aforementioned state information or log distributes the state information or log to operation terminal M (step S113).

Accordingly, operation terminal M can notify the user of the current location of vehicle C travelling in automated valet parking lot P1 on the basis of the state information or log sequentially distributed from vehicle C.

Figure 7:
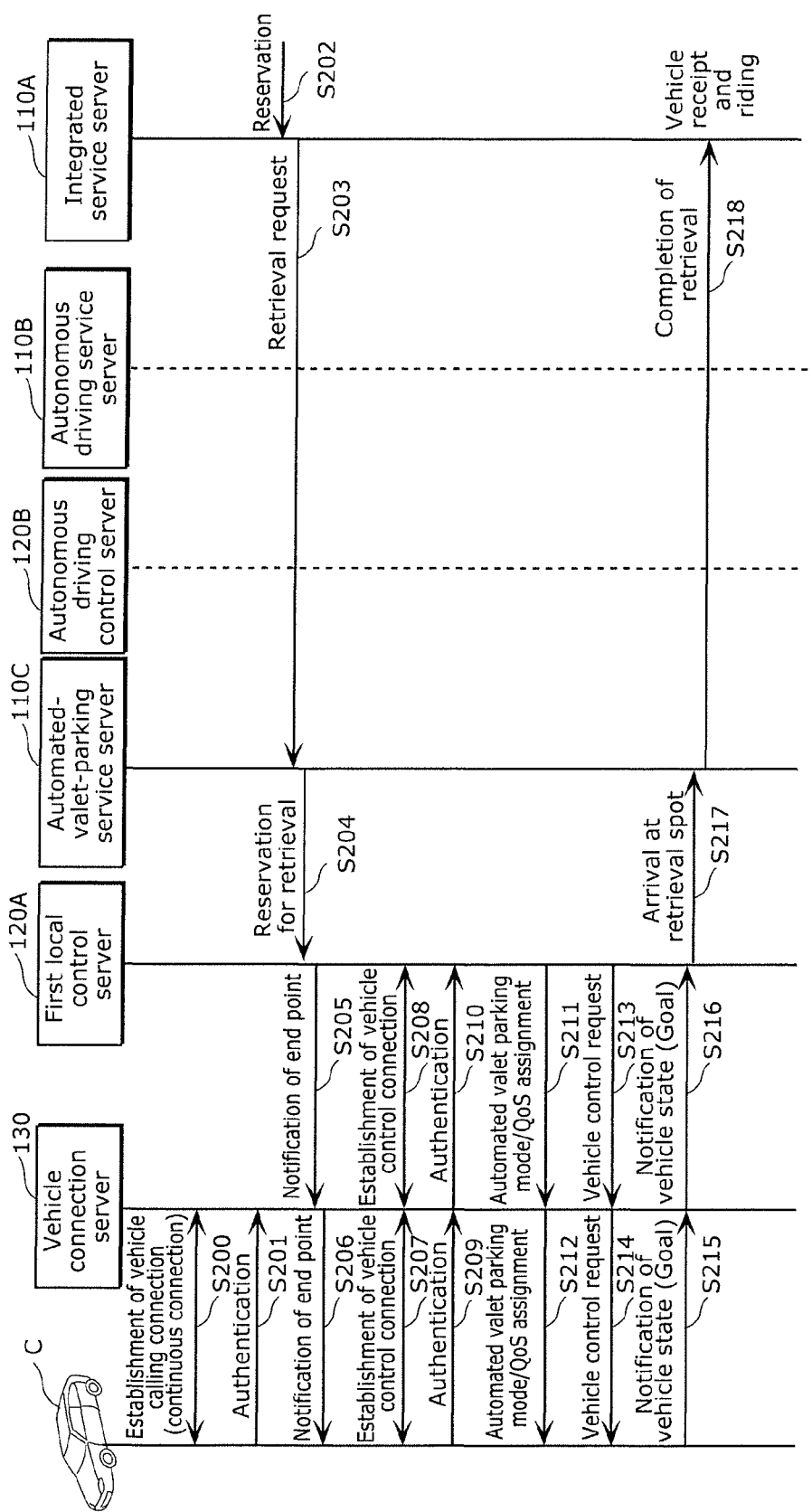
FIG. 7 is a sequence diagram illustrating another example of processing operations of the autonomous driving assistance system according to the embodiment.

FIG. 7 is a sequence diagram illustrating another example of processing operations of autonomous driving assistance system 100 according to the present embodiment. Specifically, FIG. 7 illustrates processing operations performed when vehicle C is retrieved out of automated valet parking lot P1 in response to a car-sharing reservation made by a user for vehicle C parked in automated valet parking lot P1. Autonomous driving assistance system 100 performing these processing operations include integrated service server 110A, autonomous driving service server 110B, and automated-valet-parking service server 110C as one example of the aforementioned service servers 110. Integrated service server 110A and autonomous driving service server 110B correspond to service servers 110A and 110B illustrated in FIG. 1. First local control server 120A and autonomous driving control server 120B illustrated in FIG. 7 correspond to control servers 120A and 120B illustrated in FIG. 1.

First, integrated service server 110A accepts a car-sharing reservation for vehicle C in accordance with, for example, a user operation made to operation terminal M (step S202). Integrated service server 110A that has accepted this reservation requests automated-valet-parking service server 110C that provides a car-sharing service to retrieve vehicle C (step S203). Automated-valet-parking service server 110C that has received the request to retrieve vehicle C makes a reservation for retrieval of vehicle C at first local control server 120A that has jurisdiction over automated valet parking lot P1 in which vehicle C is parked (step S204). First local control server 120A that has accepted the reservation for retrieval of vehicle C requests vehicle connection server 130 to call vehicle C and notifies vehicle connection server 130 of an end point (step S205). This end point is the end point of first local control server 120A that has accepted the reservation from automated-valet-parking service server 110C.

In the present embodiment, vehicle connection server 130 establishes a vehicle calling connection (step S200) and authenticates vehicle C (step S201). For example, vehicle connection server 130 generates a WebSocket communication route (i.e., a communication route for interactive communication) to each vehicle C and authenticates each vehicle C. This allows vehicle connection server 130 to stay connected all the time to each vehicle C. Accordingly, vehicle connection server 130 that has received the request from first local control server 120A can smoothly call vehicle C and transmit the end point to vehicle C (step S206).

Next, vehicle C called by vehicle connection server 130 establishes a vehicle control connection (steps S207 and S208). For example, vehicle C generates a WebSocket communication route (i.e., a communication route for interactive communication) to first local control server 120A via vehicle connection server 130 on the basis of the end point. Vehicle C further authenticates first local control server 120A via vehicle connection server 130 (steps S209 and S210).

First local control server 120A and vehicle C conduct negotiations for quality of service (QoS) with each other via vehicle connection server 130 and confirm the QoS (steps S211 and S212). That is, first local control server 120A assigns QoS in an automated valet parking mode to vehicle C via vehicle connection server 130.

First local control server 120A further issues a vehicle control request to vehicle C via vehicle connection server 130 (steps S213 and S214). That is, first local control server 120A transmits a control command to vehicle C.

Then, vehicle C notifies first local control server 120A of the travel state of vehicle C as a vehicle state at regular time intervals via vehicle connection server 130, while travelling in accordance with the vehicle control request (steps S215 and S216).

When having determined that vehicle C has arrived at a retrieval spot on the basis of the vehicle state given as a notification at regular time intervals from vehicle C, first local control server 120A notifies automated-valet-parking service server 110C of that arrival (step S217). The aforementioned retrieval spot is, for example, the exit of automated valet parking lot P1.

Upon receiving the notification from first local control server 120A, automated-valet-parking service server 110C notifies integrated service server 110A of the completion of retrieval of vehicle C (step S218).

Integrated service server 110A that has received the notification from automated-valet-parking service server 110C notifies operation terminal M of the completion of retrieval of vehicle C. Accordingly, the user of operation terminal M can take delivery of vehicle C that has arrived at the retrieval spot, and can ride into vehicle C.

Figure 8:
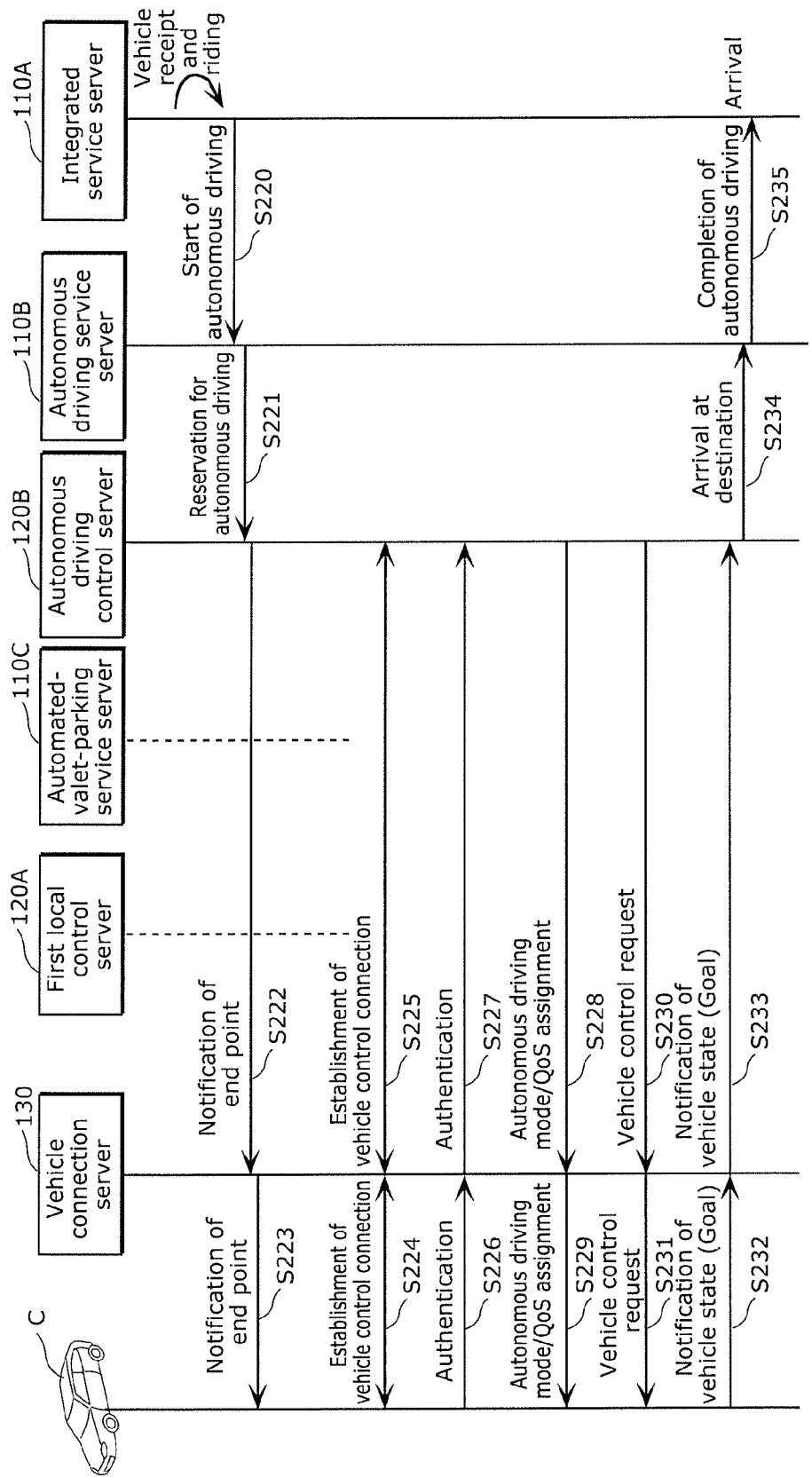
FIG. 8 is a sequence diagram illustrating yet another example of processing operations of the autonomous driving assistance system according to the embodiment.

FIG. 8 is a sequence diagram illustrating another example of processing operations of autonomous driving assistance system 100 according to the present embodiment. Specifically, FIG. 8 illustrates processing operations for assisting autonomous driving when vehicle C attended by the user as a result of the processing operations illustrated in FIG. 7 runs to the destination.

First, integrated service server 110A instructs autonomous driving service server 110B to start the autonomous driving of vehicle C in accordance with, for example, a user operation made to operation terminal M (step S220). At this time, the user sets the destination of vehicle C to operation terminal M.

Upon accepting this instruction, autonomous driving service server 1108 makes a reservation for autonomous driving of vehicle C at autonomous driving control server 120B that has jurisdiction over the area in which vehicle C runs to the destination (step S221). Upon accepting this reservation for autonomous driving, autonomous driving control server 120B notifies vehicle connection server 130 of the end point of autonomous driving control server 120B (step S222).

In the present embodiment, vehicle connection server 130 stays connected all the time to vehicle C, and therefore can smoothly transmit the end point of autonomous driving control server 120B to vehicle C (step S223).

Next, vehicle C that has received the end point transmitted from vehicle connection server 130 abandons the Web-Socket communication route generated in step S207 in FIG. 7. Then, vehicle C establishes a vehicle control connection to autonomous driving control server 120B via vehicle connection server 130 on the basis of the end point (steps S224 and S225). For example, vehicle C generates a Web-Socket communication route. Vehicle C further authenticates autonomous driving control server 120B via vehicle connection server 130 (steps S226 and S227). This enables handover between vehicle C and first local control server 120A and between vehicle C and autonomous driving control server 120B.

Autonomous operation control server 120B and vehicle C conduct negotiations for QoS with each other via vehicle connection server 130 and confirm the QoS (steps S228 and S229). That is, autonomous driving control server 120B assigns QoS in an autonomous driving mode to vehicle C via vehicle connection server 130.

Autonomous driving control server 120B further issues a vehicle control request to vehicle C via vehicle connection server 130 (steps S230 and S231). That is, autonomous driving control server 120B transmits a control command to vehicle C.

Then, vehicle C notifies autonomous driving control server 120B of the travel state of vehicle C as a vehicle state at regular time intervals via vehicle connection server 130, while travelling in accordance with the vehicle control request (steps S232 and S233).

When having determined that vehicle C has arrived at the destination on the basis of the vehicle state given as a notification at regular time intervals from vehicle C, autonomous driving control server 120B notifies autonomous driving service server 110B of that arrival (step S234).

Upon receiving the notification from autonomous driving control server 120B, autonomous driving service server 110B notifies integrated service server 110A of the completion of autonomous driving of vehicle C (step S235).

Integrated service server 110A that has received the notification from autonomous driving service server 110B notifies operation terminal M of the arrival of vehicle C at the destination. Accordingly, the user of operation terminal M can get off vehicle C that has arrived at the destination.

As described above, since the plurality of servers are arranged in a three-level hierarchy, autonomous driving assistance system 100 according to the present embodiment can relieve load concentration and appropriately assist the autonomous driving of vehicles.

In each embodiment described above, each constituent element may be configured by dedicated hardware, or may be embodied by executing a software program suitable for each constituent element. Each constituent element may also be embodied by a program execution part, such as a CPU or a processor, reading out and executing a software program recorded on a hard disk or a recording medium such as a semiconductor memory. Here, software that embodies the system or server according to each embodiment described above causes a computer to execute processing in accordance with the sequences illustrated in FIGS. 6 to 8.

[Variations]

While the autonomous driving assistance servers according one or a plurality of embodiments have been described thus far, the present disclosure is not intended to be limited to the embodiment. The present disclosure may also include other variations obtained by making various modifications conceivable by those skilled in the art to the embodiment, without departing from the scope of the present disclosure.

For example, each control server 120 may detect the approach of vehicle C into an approach target area, which is different from the area that is under the jurisdiction of the control server, through near-field wireless communication performed between vehicle C and communication equipment located around the approach target area. Then, control server 120 identifies the end point of another control server 120 that controls the travel of vehicle C in that approach target area and notifies vehicle C of the identified end point through the near-field wireless communication. Alternatively, control server 120 may notify vehicle C of that end point via vehicle connection server 130 connected to vehicle C via a wireless communication route.

The communication equipment, for example, acquires a vehicle ID, which is identification information for identifying vehicle C, from that vehicle through near-field wireless communication and transmits the vehicle ID to control server 120. Upon receiving the vehicle ID from the communication equipment, control server 120 detects that vehicle C with this vehicle ID is approaching the approach target area associated with the communication equipment. The approach target area is, for example, automated valet parking lot P, and the communication equipment is located at the entrance of automated valet parking lot P. Then, the end point of another control server 120 that is associated with the approach target area is transmitted from control server 120 to the communication equipment and is further notified to vehicle C through near-field wireless communication. Thus, control server 120 can call vehicle C parked in the approach target area without disclosing the vehicle ID of vehicle C to upper-level servers such as service servers 110. Then, control server 120 can connect called vehicle C to another control server 120 associated with the approach target area and cause the other control server 120 associated with the approach target area to control the travel of called vehicle C.

While an embodiment has been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by references on their entirety: Japanese Patent Application No. 2018-048392 filed on Mar. 15, 2018 and PCT International Application No. PCT/JP2019/008505 filed on Mar. 5, 2019.

INDUSTRIAL APPLICABILITY

The present disclosure is applicable to systems that assist the driving of vehicles.

The invention claimed is:

1. An autonomous driving assistance system for assisting driving of a vehicle, comprising:
    a service server that provides a service relating to the vehicle to an operation terminal;
    a vehicle connection server connected to the vehicle via a wireless communication route; and
    a plurality of control servers each communicating with the vehicle by handover and respectively controlling travel of the vehicle in different areas,
    wherein, when calling the vehicle parked in a predetermined area in accordance with the service provided by the service server, a control server that is associated with the predetermined area among the plurality of control servers causes the vehicle connection server connected to the vehicle to notify the vehicle of an end point, the end point being information indicating a location of the control server as a connection destination.

2. The autonomous driving assistance system according to claim 1,
    wherein, when connected to the vehicle on the basis of the end point, the control server conducts a negotiation for quality of service (QoS) with the vehicle.

3. The autonomous driving assistance system according to claim 1,
    wherein, when providing the service to the operation terminal, the service server transmits an end point of each of the plurality of control servers to the operation terminal, and
    a control server that is associated with an end point selected by the operation terminal among the plurality of control servers controls travel of the vehicle in an area associated with the control server in accordance with the service.

4. A non-transitory computer readable recording medium storing thereon a computer program having computer readable instructions, which, when executed by a processor, cause the processor to perform an autonomous driving assistance method for assisting driving of a vehicle, the method comprising:
    causing a service server to provide a service relating to the vehicle to an operation terminal;
    causing a vehicle connection server to be connected to the vehicle via a wireless communication route;
    causing each of a plurality of control servers to communicate with the vehicle by handover and control travel of the vehicle in a different area; and
    when calling the vehicle parked in a predetermined area in accordance with the service provided by the service server, causing a control server that is associated with the predetermined area among the plurality of control servers to cause the vehicle connection server connected to the vehicle to notify the vehicle of an end point, the end point being information indicating a location of the control server as a connection destination.

* * * * *